United States Patent

Smith, Jr. et al.

[11] 4,107,451
[45] Aug. 15, 1978

[54] REINFORCED SPLICE JOINT AND METHOD OF MAKING SAME

[75] Inventors: Robert W. Smith, Jr., Kennett Square; George C. Waite, West Chester, both of Pa.

[73] Assignee: Trech, Inc., Coatesville, Pa.

[21] Appl. No.: 633,243

[22] Filed: Nov. 19, 1975

[51] Int. Cl.² .................. H02G 15/08; H02G 1/14
[52] U.S. Cl. .................... 174/84 R; 156/49; 174/76; 174/93; 264/272
[58] Field of Search .............. 174/21 R, 22 R, 76, 174/77 R, 84 R, 87, 88 R, 91, 92, 93; 156/49; 285/21, 284, 292, 293; 264/272

[56] References Cited

U.S. PATENT DOCUMENTS

| 3,087,606 | 4/1963 | Bollmeier et al. | 174/87 UX |
| 3,523,607 | 8/1970 | Gillemot et al. | 174/76 X |
| 3,615,960 | 10/1971 | Hoshii et al. | 156/49 |

FOREIGN PATENT DOCUMENTS

| 1,193,851 | 5/1959 | France | 174/76 |
| 1,911,213 | 9/1970 | Fed. Rep. of Germany | 174/88 R |
| 1,270,732 | 4/1972 | United Kingdom | 174/93 |
| 971,203 | 9/1964 | United Kingdom | 174/76 |

Primary Examiner—Laramie E. Askin
Attorney, Agent, or Firm—John B. Sowell

[57] ABSTRACT

A method of making fast setting permanently reinforced splice joints between a cable sheath and a sleeve which includes preparing a mixture of resin and filler additives which shrink upon curing and adding at the time of use a catalyst with a pigment color therein to indicate proper mixing. Resilient bands of rubber-like adhesive material are applied to the ends of the cable sheath to be joined and the self-curing resin is applied over the cable ends, the resilient band and the sleeve to be joined. The resin, when cured, shrinks to form a novel reinforced sealed splice joint.

10 Claims, 3 Drawing Figures

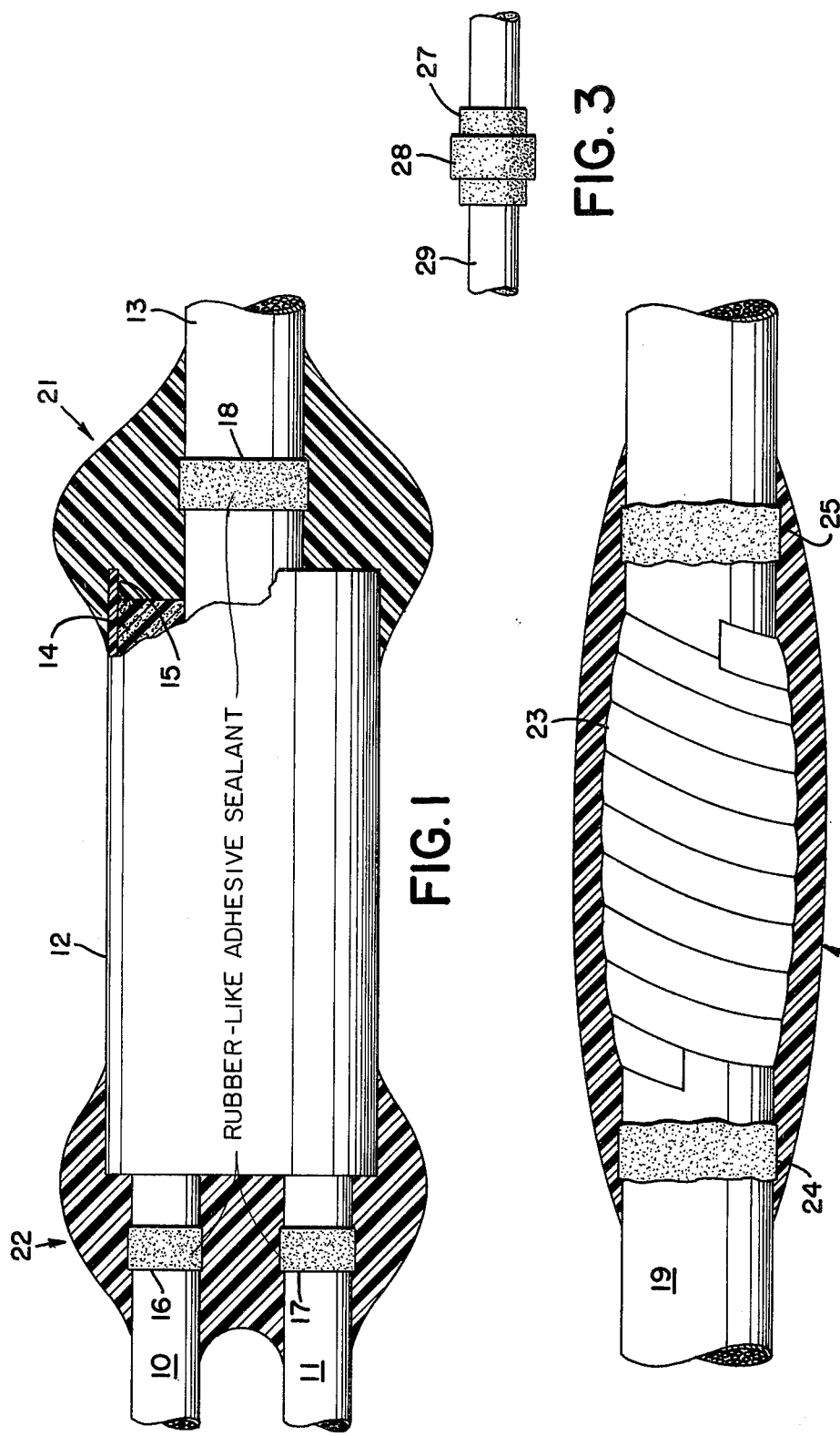

REINFORCED SPLICE JOINT AND METHOD OF MAKING SAME

BACKGROUND OF THE INVENTION

1. Field of the Invention

This invention relates to making splice joints on multiple conductor telephone cables. More particularly the invention relates to a method for preparing a cable to be joined and the method of preparing and using a filled self-curing plastic to make an air tight reinforced plastic splice joint.

2. Description of the Prior Art

Telephone cables vary in diameter depending on the number of individual lines or pairs of lines included inside the cable cover. A typical cable 3.2 inches in diameter contains 2700 pairs of wires. The outer cover or protective layer is typically made of lead extruded on the cable at the time of manufacture. More recently cables have been made with an outer protective cover made of plastics such as polyethylene, polypropylene and polybutylene. All such cables are capable of being installed underground and the joints must be completely sealed and air tight. When such cables are originally installed, the cables must be sealed at the splice joint. When the lines fail or maintenance requires that the cables be opened, the outer layer or cover must be opened to facilitate repairs and then resealed to provide air tightness at eleven pounds per square inch.

Heretofore, lead covered cables which are sealed have been sealed by making lead wiped joints. Such joints are made by covering the open area with a lead plate sleeve wrapped around the open area and then applying molten lead to form a cover which extends from one end of the cable over the lead covered open area to the other end. The hot molten lead forms a molecular bond with lead on the cable and the lead sleeve and would be expected to be superior to the parent cable. If lead wiped joints could be made in a factory and left undisturbed, very few joints would give trouble. In large cities, in and around telephone exchanges and even in large buildings, a very large number of telephone cables are hung or supported adjacent each other on large racks and hangers. To obtain access to a particular cable it is usually required that several cables be moved and bent out of shape. After the particular cable is repaired, the cables must be bent and moved back in place which often causes additional breaks in the existing and just made lead wiped joint. Workmen often climb over such cables and cause stresses in and bending of the repaired cables. It has been found that most leaks and breaks in repaired cables occur at the joint connection where the parent cable enters the splice joint. It is believed that the stiff and enlarged splice joint induces maximum stresses in the adjacent cable and that the hot lead connection to the cold lead cover creates a crystalline cold joint junction subject to breakage when strained.

Not only are lead splice joints subject to easy failure but they are time consuming to make and require special skill on the part of the workmen who work with molten lead and heating devices.

Splice joints made on plastic covered cables are usually only wrapped tape which will not provide a water tight seal between the plastic cover and the material used to close the joint.

Splice joints whether made from hot lead or a plastic material must meet standard underwriting and laboratory tests which are designed to prove the usefulness of the splice joint and/or the splice case used to facilitate making the splice joint. It is believed that no plastic splice joint heretofore proposed has been able to meet the underwriters test for compression, tension and bonding and still maintain a proper seal.

SUMMARY OF THE INVENTION

The present invention provides a filled resin which may be hand mixed in the field and hand applied to a properly prepared cable joint to make a reinforced splice joint which is stronger than the parent cable.

The present invention provides a method of applying a filled resin over a properly prepared sleeve and cable to produce a sealed splice joint.

An object of the present invention is to provide a method and means for making splice joints on lead cable which require no professional skill or training and which are superior to a lead splice joint.

Another object of the present invention is to provide a compact kit of filled resin and colored catalyst and manual aids for preparing a reinforced plastic splice joint without requiring external heat or any tools to make the joint.

A general object of the present invention is to provide a method and means for making splice joints faster and better than was heretofore possible.

In accordance with these and other objects of the present invention there is provided a pre-mixed filled resin in a sealed accessable pouch which is thick in consistency permitting manual mixing of a catalyst therein without dripping and further permitting manual application and shaping into a splice joint on a cable prepared to accept the mixture which shrinks and seals upon curing.

BRIEF DESCRIPTION OF THE DRAWINGS

FIG. 1 is an elevation view in partial section of a splice joint having two lead covered cables entering a sleeve at one side and one lead covered cable entering the sleeve at the other side.

FIG. 2 is an elevation view in partial section of a splice joint made over an opening in a single continuous plastic covered cable.

FIG. 3 is a partial elevation of a covered cable having a preferred modified seal of the type made in the field.

DESCRIPTION OF THE PREFERRED EMBODIMENT

FIG. 1 shows a pair of covered cables 10, 11 entering into a splice case 12 and a larger covered cable 13 entering the splice case 12 from the other side. The undisturbed covered cables extend well into the splice case 12 before being opened. Splice case sleeves 12 have been made of various materials such as lead, steel and cast iron. The splice case is preferably cut to length to extend over the area where pairs of wires have been individually spliced to complete the proper telephone line connections. If the installation is new, the splice case 12 may be a continuous cylinder slipped over the cables before the connection is made. When the cables are already joined, the splice case must be split to facilitate installation over the cables without breaking the connections. Split splice cases are provided with means for sealing the axial slit or break to provide the equivalent of a continuous cylindrical sleeve.

The splice case 12 shown in FIG. 1 is preferably made of a glass filled polyester resin; however, any equivalent strength filled resin which is compatible with the plastic mixture used for the splice joint and provides a molecular bond with the plastic mixture can be substituted. Before the plastic mixture is applied the cables must be properly prepared by removing all loose particles of dirt and contamination from the cables 10, 11, 13 and the splice case 12. Filler pieces 14 made of STYROFOAM (TM) or compressible urethane are pushed into the inside of the splice case 12 leaving a short portion of the inside 15 of the splice case 12 exposed.

Continuous bands of sealant material 16, 17, 18 are applied around each of the cables 10, 11, 13. It is preferred that the bands of sealant material 16, 17, 18 provide a molecular bond between the cables and the plastic mixture used for the splice joint; however, this has not been found practical for all field applications. Plastic mixtures useful for making rigid reinforced splice joints on lead covered cables and on commercially produced flexible plastic covered cables, such as those mentioned herein before, do not provide a chemical or a molecular bond to the covers of the cables. A band of adhesive sealant is employed which is soft and sticky and extrudes under high pressure. Preferably the sealant becomes slightly softer under the influence of heat but does not deteriorate with age and/or become hard. Several adhesive sealants have been found which meet these requirements. Resilient cured natural rubber applied as a wrapped fine string and covered with an adhesive such as PLIOBOND (TM) provides a very good adhesive seal. Other adhesives which contain rubber base latex and solvents such as methyl ethyl ketone also form adhesive seals with cured natural rubber. Butyl caulking compounds in thick pastes or putty form and having a high uncured rubber content applied as a band and smoothed on the cable will provide an adhesive seal. Commercially available extruded partially cured butyl rubber which is available in tape form has been found to be suitable as an adhesive sealant. Such tape is commonly known in the telephone industry as B Tape and is available from several manufacturers and Western Electric Company.

A preferred adhesive sealant is isobutylene propylene terpolymer. This synthetic rubber polymer is sold by Du Pont under the name NOREL 1145 and can be purchased blended with fillers, carbon black and oil to form a substantially incompressible sticky pliable string or tape. The tape (wrapped adhesive sealant), applied as a homogeneous 1 inch × 1/32 inch band forms a partial molecular bond with the plastic mixture and a tight adhesive bond with the cable covers.

The above-mentioned cured and uncured rubber adhesive sealants do not have to form a molecular bond with the lead or plastic covers on the prior art cables to be pressure tight. Preferably the bands of sealant material are made at least one-half inch wide on main cables and positioned near the center of the splice joint portion covering the cable sheath.

After the ends of the splice case 12 are blanked off with filler pieces 14 and the rubber-like adhesive seals 16, 17 and 18 are applied, the splice joint filled plastic mixture is applied to provide a joint which covers the adhesive seals 16, 17 and 18 as well as the ends of the splice case 12. The extent and shape of the splice joints 21, 22 depend to some extent upon the material used for the splice case but should be sufficient to make the splice joints more rigid and stronger than the portions of the cable and splice box adjacent the joints 21, 22. As will be explained hereinafter, the plastic mixture employed will become exothermic during curing and will shrink so as to extrude the adhesive bands 16, 17, 18, shown before extrusion has taken place.

FIG. 2 shows a continuous main cable 19 of the type having the repaired wires therein covered with a tight repair wrapped sleeve 23 of plastic electrical tape. Heretofore, it was common practice to repair plastic covered cables and even lead cables by applying multiple layers of plastic tape especially when there was an air leak and when no tension would be expected to be applied to the cable. The plastic tape applied to make wrapped sleeve 23 may be resilient polyethylene electrical tape with an adhesive surface or other equivalent tapes. It has not been found necessary to apply a more resilient adhesive sealant or sealant-type tape under the wrapped sleeve 23 even though it may enhance the flexibility of the joint and its seal over a leak as was done in the prior art.

Bands of resilient sealant material 24, 25 are applied prior to the application of the filled plastic material employed to make splice joint 26. The filled plastic mixture is shaped to cover the entire wrapped sleeve 23 and the bands of resilient sealant 24, 25 in a manner which leaves the splice joint 26 stronger than the adjacent cable. Joint 26 is effectively a continuous sleeve over the repaired area.

In a preferred embodiment, the filled plastic mixture is made from a polyester resin base and has a consistency that causes it to stick to the outer plastic or lead cover of the telephone cable; however, the bond between the filled plastic mixture and the insulation cover is not a molecular bond as occurs when a polyester fiber glass splice case 12 is employed.

FIG. 3 shows a modified form of sealant band, like bands 16 17, 18 and 24, 25. The layer of sealant material 27 is the same as has been described herein before. Such sealant materials adhesively bond to the cables 29 as well as the filled mixture of the splice joint but do not form a chemical or molecular bond. A second sealant band 28 is applied on top of sealant band 27. This second band is made of a very sticky, pliable and resilient material which partially enters into chemical action with the filled mixture of the splice joints but remains very sticky and pliable. Such material is commercially available in tape form and is known in the telephone industry as A Tape. A Tape is also known as fully crossed linked butyl rubber with Arizona Tacifier added before being cross linked. Another material found to bond to the filled mixture splice joint is Elastomer 7500 available from Parr Chemical Co. and commercially used as a glass-to-metal or glass-to-glass sealant in the glazing industry.

One of the most desirable features of the present invention is the manner in which the filled mixture may be prepared in kit form before it is used and the method of using the kit to prepare a splice joint in the field. Workmen can be trained to make a plastic splice joint in a single demonstration and are capable of making plastic splice joints in less than one third the time required to make a hot lead wiped joint. Not only is the reinforced plastic splice joint superior to a hot lead joint but there are no heaters or special tools required for the making of the joint. When it becomes necessary to remove the reinforced plastic splice joint, it will break by striking it with a blunt heavy instrument such as a hammer and the same opening repaired with another filled plastic mixture.

The order in which a preferred filled mixture may be prepared is as follows:

One hundred parts by weight of polyester resin such as Diamond Shamrock 6307T (which is a low viscosity thermosetting resin) is mixed with up to three parts by weight of di methyl aniline promoter. Six parts by weight of CAB-O-SIL (TM) thixotropic agent is added to the mixture followed by up to 100 parts by weight of talc continuously mixed in until smooth. Five parts by weight of number five chopped fiber glass are blended into the smooth mixture so as not to break up the fiber glass below one inch in length. Globs of this reinforced fiber glass mixture are weighed into three to five pound packages and wrapped in a polyethylene sheet which is placed inside an air and vapor tight pouch and placed in a kit container.

Inside the kit container is placed a separate tube of benzoyl peroxide catalyst in paste form with a color pigment added which contains about three percent benzoyl peroxide by weight of resin glob.

After the wires in the cables are repaired and the cables prepared with a proper repair sheath or splice case and sealing material bands are placed on the cables, the filled mixture to be applied to make the splice joints is prepared.

A pair of disposable gloves (preferably latex or plastic) are placed on the hands of the splice maker. The tube of colored benzoyl peroxide paste is opened. The container of filled mixture is opened and the thick non-flowable putty-like sticky glob is removed from the polyethylene sheet container. While holding the glob in gloved hands, the splice maker mixes in the colored pigment catalyst until the glob is consistent in color. The glob is so thick it will not drip or sag and maintains its consistency at the wide range of outdoor temperatures. The filled mixture will maintain its consistency up to its ignition point of about 900° F; thus, it is completely safe and predictable. The filled mixture is molded by the gloved hands into a splice joint and may be left to cure. The filled mixture will gel or set in about thirty minutes; however, this time may be varied by changing the amount of the catalyst and/or the promoter. The filled mixture will cure in about three hours but it is safe to reposition the cable and the splice joint after the splice joint is set and before it is cured. The glob of filled mixture is thick and sticky until it gels and the joint will be rough where the gloves are pulled away from the sticky glob. The gloves may be removed and discarded after the joint is first made and a sheet of clean polyethylene placed over the soft splice joints. The sheet may be manipulated to reform the rough splice joint and left in place until the mixture gels. When the polyethylene sheet is removed from the gelled or cured splice joint, the surface will be as smooth as the polyethylene sheet used to remold and reshape the joint.

While a single embodiment filled mixture is explained in detail employing polyester resin, it will be understood that other filled resins may be employed. It has been found that polyester resins of different manufacturers each require testing to determine the proper amounts of promoter and catalyst. Accordingly it will be necessary when substituting various epoxies, phenolics and vinyl polyesters, or similar high strength resins, to substitute recommended amounts of catalyst and promoters to provide equivalent gel and curing times.

While CAB-O-SIL (TM) is a preferred thixotropic filler, other brands of colloidal silica and thickening agents are well known and may be employed to thicken but not stiffen the filled mixture.

While talc is a preferred filler which adds bulk to the resin and provides a smooth putty-like sticky mass, other fine fillers which reduce shrinkage and exothermic heat build up are well known and may be substituted. Such fillers as metal carbonates and silicates, ground glass, fine silicates, powdered marble or stone and other natural inorganic powders are known usable fillers.

While very fine fiber glass is a preferred reinforcing and strengthening agent which has several advantages, it mainly serves to make the filled mixture become tenaciously sticky and putty-like. Other fibers such as nylon or carbon or equivalents may be employed.

The preferred polyester filled resin described above was found to shrink upon curing four percent by volume or 0.04 inch per inch. The range of two to five percent shrinkage is preferred. When splice joints 21, 22 and 26 shrink, the adhesive bands 16 17, 18, 24 and 25 are extruded axially along the cable as the filled mixture closes about the bands. When a compound adhesive band such as that shown in FIG. 3 is employed, the outer layer of adhesive sealant bonds to the filled mixture and forces the outer layer radially inwardly into the inner layer of adhesive. The filled mixture will form a molecular and adhesive bond to splice case 12 made of reinforced fiber glass.

Attempts to flex or strain the splice joints cause the cables to bend at a point well removed from and outside the joint; thus, it will be understood that the joint becomes a reinforcement for the cable or cables and that normal abuse of bending will not bend the cable inside the splice joint. Since the cable is reinforced, it can be pulled out of alignment, repaired and placed back in alignment on a rack or hanger without the usual danger of breaking open a splice joint. The preferred splice joint is leak proof and gas tight (pressure tight) and will form a conduit for dry gas circulated under pressure inside the sheath or cover even though under extreme stress the cable may move relative to the splice joint.

We claim:

1. The method of making a permanent air tight splice joint between the spaced ends of a cable sheath comprising the steps of:

applying a sleeve over the area between the spaced ends of the cable sheath, winding discontinuous strips of rubber like adhesive sealant to form sealant bands of continuous homogeneous rubber-like adhesive material around the spaced ends of the cable sheath, preparing a filled resin containing a thixotropic agent, a bulk filler and fiber glass having a thick non-flowable putty-like consistency which becomes exothermic and shrinks upon curing and which is chemically compatible with the materials of the sleeve and sealant bands and will form a molecular bond therewith, manually wiping the filled resin over said sealant bands, the ends of the cable sheath and the sleeve to form a built-up reinforced splice joint therebetween encapsulating said sealant bands, permitting the filled resin joint to cure and shrink onto said adhesive sealant bands to form a rigid reinforced sealed splice joint partially molecularly bonded to said adhesive sealant bands and said sleeve and which is stronger than the parent cable in bending and compression.

2. The method as set forth in claim 1 wherein the step of winding said sealant bands on said cable sheath comprises the step of winding a string of isobutylene-propylene terpolymer synthetic rubber under tension upon itself to form homogeneous built-up sealant bands.

3. The method as set forth in claim 2 wherein the step of preparing a filled resin includes the steps of providing a low viscosity thermosetting polyester base resin and a di methyl aniline promoter in the base resin.

4. The method as set forth in claim 3 wherein the step of preparing a filled resin further includes the steps of providing a separate stablized benzoyl peroxide catalyst in paste form which includes a coloring material and further includes the step of mixing the colored catalyst just prior to the time of use so that the benzoyl peroxide reacts with the di methyl aniline to start the polyester base resin curing.

5. A method as set forth in claim 4 which further includes the step of adding up to 3% di methyl aniline by weight of base polyester resin and approximately 3% benzoyl peroxide by weight of the base polyester resin to obtain a gel time of less than 30 minutes at room temperature.

6. The method of making a permanent pressure tight reinforced splice joint between the spaced ends of a cable outer sheath lying on opposite sides of repaired cable wires comprising the steps of:
applying a plastic sleeve over the repaired cable wires and the spaced ends of the cable sheath,
applying a resilient adhesive band as a spiral wrap around the spaced ends of the cable sheath to form homegeneous adhesive bands thereon,
putting on a pair of gloves,
removing a glob of filled thick resin of a type which is chemically compatible with the materials of the sleeve and adhesive sealant bands and will form a molecular bond therewith from a container,
removing a thick, colored, paste catalyst from an airtight container and manually mixing the catalyst with the filled resin,
manually kneading the filled resin with the colored catalyst until the filled resin mixture is consistent in color,
applying the filled resin mixture with gloved hands over the ends of said sleeve and the spaced ends of the cable sheath adjacent said sleeve to cover said adhesive bands,
shaping the filled resin mixture with gloved hands into a desired shape joint, and
permitting said filled resin mixture to self cure and shrink onto said adhesive sealant bands and said sleeve to form a molecular bond therewith providing a pressure tight reinforced sealed splice joint stronger than the parent cable in bending and compression.

7. The method of making a permanent reinforced splice joint as set forth in claim 6 wherein the step of applying a sleeve over the repaired wires and spaced ends of the cable sheath comprises applying a split sleeve thereover and further includes the step of applying the filled resin over said split in said sleeve to form a molecular bond therewith.

8. The method of making a permanent reinforced splice joint as set forth in claim 6 which further includes the step of applying a non-adherent plastic sheet over said shaped filled resin mixture and reshaping said joint before it gels.

9. The method of making a permanently reinforced splice joint as set forth in claim 8 which further includes the step of removing said non-adherent plastic sheet after said reshaped resin mixture has had time to gel.

10. A permanent pressure tight reinforced splice joint connecting spaced ends of an outer sheath of a telephone cable lying on opposite sides of repaired cable wires, comprising:
a rigid plastic sleeve applied over the repaired cable wires and extending over the spaced ends of the cable sheath,
sealant bands of adhesive rubber material, each being in the form of a string of adhesive sealant wound upon itself, wrapped around the spaced ends of the cable sheath adjacent the ends of said sleeve and forming tight adhesive bonds with said spaced ends of the cable sheath, and
a cured filled resin extending over the ends and opening of said sleeve and also encapsulating and sealing said adhesive sealant bands on said cable sheath under pressure, said cured filled resin containing chopped glass fibers, a thixotropic agent, a filler and a catalyst, and said cured filled resin being chemically compatible with said rigid plastic sleeve and said adhesive sealant bands and forming partial molecular bonds therewith.

* * * * *